No. 717,791. PATENTED JAN. 6, 1903.
F. L. ADAMS.
LAWN MOWER.
APPLICATION FILED JAN. 22, 1902.
NO MODEL.
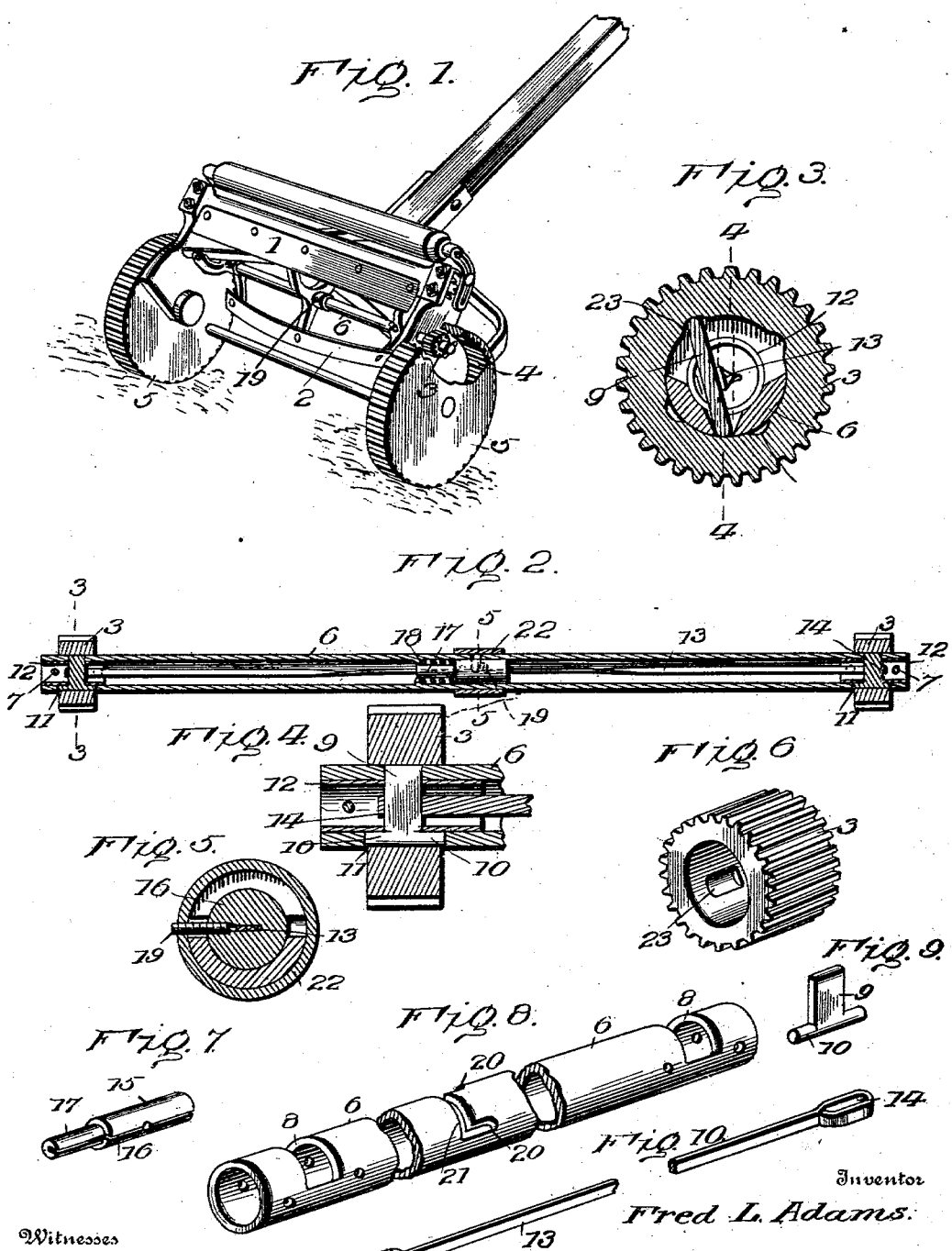
Witnesses
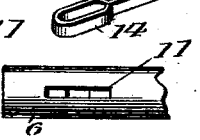
Inventor
Fred L. Adams.
By R. & A. B. Lacey
Attorneys

UNITED STATES PATENT OFFICE.

FRED L. ADAMS, OF PROPHETSTOWN, ILLINOIS.

LAWN-MOWER.

SPECIFICATION forming part of Letters Patent No. 717,791, dated January 6, 1903.

Application filed January 22, 1902. Serial No. 90,836. (No model.)

*To all whom it may concern:*

Be it known that I, FRED L. ADAMS, a citizen of the United States, residing at Prophetstown, in the county of Whiteside and State of Illinois, have invented certain new and useful Improvements in Lawn-Mowers; and I do hereby declare the following to be a full, clear, and exact description of the invention, such as will enable others skilled in the art to which it appertains to make and use the same.

This invention relates to certain improvements in lawn-mowers of that class in which a series of rotary knives act against a stationary cutting-bar, and has for its principal object to provide means for facilitating the sharpening of the knives or blades of the reel and also the cutting-bar without removing the same from the machine and also without the removal or interchanging of any of the parts thereof.

When sharpening the cutting apparatus of a lawn or other mower, the machine is usually inverted to bring the fixed cutter into an upright position, and emery or other abrasive material and oil or other liquid are supplied to the said cutter and find their way between the stationary and the rotary blades and grind them to an edge. This is generally effected by reversing the motion of the cutting-reel, which is done by changing the ratchets or clutch mechanism by removing the driving-wheels and changing sides with the said ratchets, which cause a reverse motion as the ratchets are made right and left, after which the various parts must be returned to their original positions to rotate the reel in the proper direction for cutting.

The object of this invention is to provide a means whereby so much of this seemingly unnecessary work can be avoided and the clutch mechanism reversed in an instant to change the directions of rotation of the cutting-reel, thereby obviating the annoyance, loss of time, and the labor required to shift parts resulting from the present construction.

For a full description of the invention and the merits thereof and also to acquire a knowledge of the details of construction of the means for effecting the result reference is to be had to the following description and drawings hereto attached.

While the essential and characteristic features of the invention are susceptible of modification, still the preferred embodiment of the invention is illustrated in the accompanying drawings, in which—

Figure 1 is a perspective view of a lawn-mower inverted and in position for sharpening the cutting mechanism by reversing the movement of the cutting-reel. Fig. 2 is a central longitudinal section of the shaft of the cutting-reel on a larger scale. Fig. 3 is an enlarged section on the line 3 3 of Fig. 2. Fig. 4 is a longitudinal section on the line 4 4 of Fig. 3. Fig. 5 is an enlarged section on the line 5 5 of Fig. 2. Fig. 6 is a perspective view of one of the pinions applied to the ends of the cutting-reel shaft. Fig. 7 is a perspective view of the plug loosely fitted within the cutting-reel shaft for operating the clutch. Fig. 8 is a detail perspective view of the shaft of the cutting-reel having parts broken away. Fig. 9 is a detail perspective view of the dog or clutch element. Fig. 10 is a perspective view of the rod by means of which the clutch is operated. Fig. 11 is a detail view of an end of the shaft, showing the opening for reception of the head of the dog.

Corresponding and like parts are referred to in the following description and indicated in all the views of the drawings by the same reference characters.

The mowing-machine may be of any type or pattern comprising a stationary cutter 1 and a rotary cutting-reel 2, adapted to be driven from the ground-wheels by means of pinions 3 at the ends of the shaft of the cutting-reel, in mesh with cog-gearing 4 of the ground-wheels 5.

In accordance with this invention the shaft 6 of the rotary cutting-reel is tubular and the pinions 3 are loosely mounted upon its end portions and are held in place by pins 7 or any desired securing device. An opening 8 is formed in a side of the tubular shaft near each end and receives a dog or clutch element 9, mounted therein for pivotal movement. The dog or clutch element is of T form, and its cross-head 10 is adapted to obtain a bearing in an opening 11 in the side of the shaft 6, directly opposite the center of the opening 8. The dog or clutch element 9 equals in length the outer diameter of the shaft 6, so as not to project beyond opposite sides of the shaft when turned to a diametrical position, thereby admitting of the cutting-reel turning freely in either direction. The opening 11 constitutes a seat for the head of the part 9. A thimble 12 is slipped into each end of the shaft 6 and extends across a portion of the opening 11 at each end, so as to engage with the arms of the head 10 and limit the inward movement of the dog 9 when passed through the openings 11 and 8. Outward displacement of the part 9 is prevented by the pinion 3 closing the outer side of the opening or seat 11, as shown most clearly in Figs. 3 and 4.

A spring rod or bar 13 is located within the shaft 6, and its end portions have connection with the dog or clutch elements 9 at opposite ends of the said shaft. While the connection between the parts 9 and 13 may be effected in any manner, it is preferred to have loops 14 at the ends of the part 13 for the reception of the parts 9, thereby admitting of the ready removal or placing of the several parts in position. This spring rod or bar 13 controls the relative position of the clutch elements 9 with reference to the shaft 6 and the pinions 3 and is adapted to be operated from a point exterior to the shaft in any convenient way, so as to admit of reversing the clutches when required.

A plug 15 is loosely fitted within the shaft 6 and is connected with the part 13 for movement therewith. In the construction shown the plug 15 has a longitudinal kerf 16 in a side to receive the part 13, and an end portion of the plug is reduced, as shown at 17, to receive a coil-spring 18, confined between a shoulder of the plug and an inner shoulder or stop of the shaft 6. The plug is mounted within the shaft for rotary and longitudinal movement and is acted upon by the spring 18 to hold the pin 19 applied thereto in one or the other of the notches 20, formed at the ends of a circumferential slot 21 in a side of the shaft 6. A sleeve 22 encircles the shaft 6 and conceals the slot 21 and notches 20 and is connected with the plug 15 by means of the pin 19. The sleeve 22 constitutes the means for operating the clutch mechanism to throw it into or out of operation or to reverse the direction of rotation of the cutting-reel. The sleeve 22 is moved longitudinally upon the shaft 6 to disengage the pin 19 from either one of the notches 20, and a turning of the sleeve causes the pin 19 to travel in the slot 21 and effect a shifting of the clutch mechanism, so as to reverse the direction of rotation of the cutting-reel when operated. When the sleeve 22 is turned to the limit of its movement in either direction and is released, the spring 18, regaining itself, moves the plug 17 and sleeve 22 longitudinally and causes the pin 19 to enter the notch 20 at the end of the slot 21, to which the pin has been moved, thereby locking the clutch mechanism in the required position.

When the dog or clutch element 9 occupies a diametrical position, the cutting-reel is free to move in either direction; but when the said dog is thrown to one side or the other of a diametrical position its free end is projected beyond the outer side of the shaft 6, so as to engage with the inner side of the pinion and cause rotation thereof in one direction. Rotation of the shaft in an opposite direction causes the gripping end of the dog to move toward a diametrical position and effects a disengagement thereof from the pinion, as will be readily understood. To effect positive engagement of the dog with the pinion, the latter is formed in its inner side with one or more notches 23, in which the outer end of the dog becomes seated, thereby preventing slipping.

Having thus described the invention, what is claimed as new is—

1. In cutting apparatus for mowing-machines, and in combination with the rotary cutter and actuating mechanism therefor, a pinion loosely mounted upon the shaft of the said rotary cutter and in mesh with the drive-gear, and a single reversible clutch between the said pinion and shaft to connect them for rotation in either direction and admit of the clutch slipping when the pinion is turned in the opposite direction in either extreme position of the clutch, substantially as set forth.

2. In cutting apparatus for mowing-machines, and in combination with the rotary cutter and the actuating mechanism therefor, a single reversible clutch between the rotary cutter and the actuating mechanism to connect them for rotation in either direction and admit of the clutch slipping when the actuating mechanism is turned in the opposite direction in either extreme position of the clutch, substantially as specified.

3. In cutting apparatus for mowing-machines, a rotary cutter having a tubular shaft, a pinion loosely mounted upon the said shaft, and a single reversible clutch located within the shaft to connect the pinion thereto for rotation of the cutter in either direction and admit of the clutch slipping when turning the pinion in the opposite direction in either extreme position of the clutch, substantially as described.

4. In cutting apparatus for mowing-machines, a rotary cutter having a tubular shaft provided with a side opening, a pinion loosely mounted upon the shaft so as to cover said opening, a reversible clutch located within the shaft, and means for reversing the clutch to effect positive rotation of the shaft in either direction, substantially as set forth.

5. In cutting apparatus for mowing-machines, a rotary cutter having a tubular shaft provided with a side opening and a seat opposite said opening, a reversible clutch located within the shaft and having one end fitted in the said seat and its opposite end entering the side opening, a pinion loosely mounted upon the shaft, and means for reversing the clutch to effect rotation of the shaft in either direction, substantially as specified.

In testimony whereof I affix my signature in presence of two witnesses.

FRED L. ADAMS. [L. S.]

Witnesses:
ANDREW T. GOSSMAN,
W. D. SMITH.